United States Patent [19]

Yonekura et al.

[11] 4,247,271

[45] Jan. 27, 1981

[54] CONTINUOUS VULCANIZER FOR PRODUCING ELONGATED MEMBER

[75] Inventors: Shiro Yonekura, Nagano; Tsutomu Matsutani, Ueda; Yoshiyuki Nishikawa, Nishinomiya, all of Japan

[73] Assignees: Daiichi-Nippon Cables, Ltd., Hyogo; Mitsuba Mfg Co., Ltd., Tokyo, both of Japan

[21] Appl. No.: 973,996

[22] Filed: Dec. 28, 1978

[30] Foreign Application Priority Data

Dec. 30, 1977 [JP] Japan .................. 52/157838

[51] Int. Cl.³ .............................. B29H 5/28
[52] U.S. Cl. ..................... 425/68; 264/236; 264/347; 425/71; 425/379 R; 425/384; 425/404; 425/445
[58] Field of Search ............. 425/67, 68, 71, 383, 425/384, 404, 445, 379; 264/236, 347

[56] References Cited

U.S. PATENT DOCUMENTS

| 2,139,414 | 12/1938 | Lee | 425/67 |
| 2,678,838 | 5/1954 | Richardson et al. | 425/383 |
| 3,588,954 | 6/1971 | Nakamura et al. | 425/445 |
| 3,635,621 | 1/1972 | Miyauchi et al. | 425/445 |
| 3,909,177 | 9/1975 | Takaoka et al. | 264/236 |
| 4,029,450 | 6/1977 | Caser | 425/445 |
| 4,179,256 | 12/1979 | Tomioka et al. | 425/71 |

Primary Examiner—Jeffery R. Thurlow
Attorney, Agent, or Firm—Sughrue, Rothwell, Mion, Zinn and Macpeak

[57] ABSTRACT

A horizontal type vulcanizer for continuous production of an elongated member made of a natural or synthetic polymer. The elongated member passes through a pressurized liquid heat medium to achieve vulcanization. Leakage from the liquid bath seal is prevented by having an intermediate separation portion and balancing the pressure in the bath with that in the intermediate portion. Thermal deterioration of the seal is prevented by cooling the liquid bath in the region adjacent the seals to increase the viscosity of the bath in that region. A water jacket positioned in contact with the front face of the extruder head prevents scorching of the elongated member prior to vulcanization.

12 Claims, 7 Drawing Figures

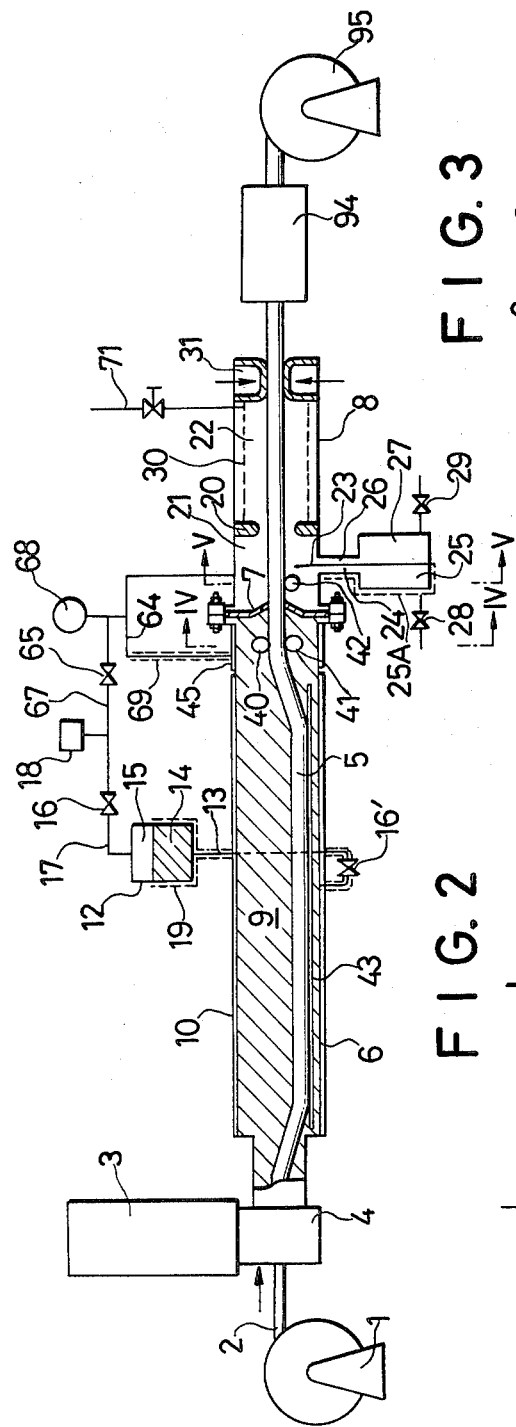
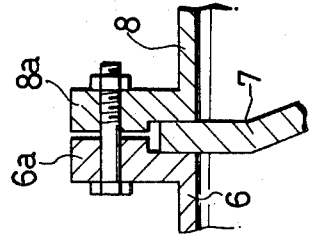
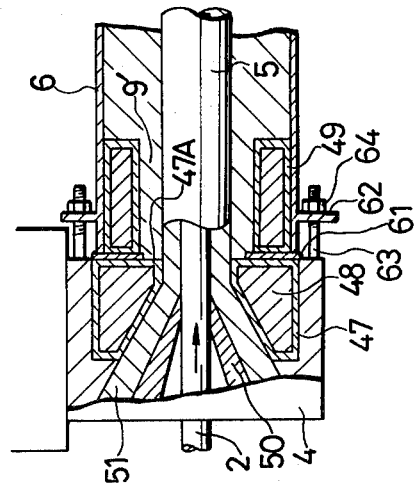

CONTINUOUS VULCANIZER FOR PRODUCING ELONGATED MEMBER

BACKGROUND OF THE INVENTION

1. Field of the Invention

This invention relates to a horizontal type vulcanizer for continuously producing an elongated member such as a tube, hose, rod, electrically insulated wire and cable, and profile, made of natural or synthetic polymer such as rubbers and plastic materials. The elongated member is continuously passed through a liquid heat medium under pressure subjecting it to heat and vulcanization.

2. Description of the Prior Art

There is a significant disadvantage in conventional devices for continuously extruding and vulcanizing the material to produce elongated members in that the elongated member is deformed, if bent greatly or changed its travelling direction, during its incomplete vulcanization state. Therefore, a requirement exists to provide a horizontal type continuous vulcanizer in which the liquid heat medium is filled and wherein the elongated member in unvulcanized state just extruded from an extruder is substantially linearly passed through the liquid heat medium under pressure until the vulcanization is completed. In this case, a minute bend of the elongated member due to its weight or buoyancy is negligible.

In order to meet this demand, U.S. Pat. No. 4,029,450 discloses a horizontal type vulcanizer in which liquid heat medium (bath liquid) flowing down from the inlet and the outlet of the horizontal bath for passing the elongated member therethrough is recirculated into the bath by means of a pump. However, during operation it is rather difficult to recirculate under pressurized condition such liquid maintained at a high temperature, suitable for vulcanization of the elongated member, of about 200° C. That is, a pump is required which sustains high temperature and high pressure. Furthermore, the recirculation system is required to have thermal resistance for a long duration, so that the system is complicated and costly.

In case of the employment of a bath liquid having a high melting point of about 100° C. or more, such as eutectic mixed salt consisting of $NaNO_3$, $NaNO_2$ and $KNO_3$, the temperature of the liquid in the recirculation system should be monitored during operation. If a low temperature region below the melting point of the liquid is generated in the portion of the recirculation system, the salt mixture is solidified thereat to thus block the liquid recirculation. Once the liquid recirculation is blocked, the vulcanizer is exposed to danger of explosion caused by the possible direct contact of cooling water with the bath liquid of high temperature which may flow into a cooling system. In the above-mentioned U.S. Patent, a vulcanizing tube having U-shaped in cross-section is also shown. According to this U-shaped tube, no problem may be arisen in terms of flowing down of the bath liquid above mentioned, and thus there is no necessity of recirculating the bath liquid. However, it would be rather difficult to pass the elongated member through the U-shaped vulcanizing tube under tension control, especially in the case where the elongated member has a specific gravity lower than that of the bath liquid, and therefore floats in the bath liquid.

SUMMARY OF THE INVENTION

It is therefore an object of this invention to overcome the above-mentioned drawbacks in such prior art systems.

It is another object of this invention to provide an improved horizontal type vulcanizer filled with a heated and pressurized bath liquid with having simple construction to linearly move the elongated member for its vulcanization.

Yet another object of this invention is to provide a horizontal vulcanizer for continuous vulcanization in which bath liquid having high melting point of at least about 100° C. is usable as a liquid heat medium without providing bath liquid recirculation system.

Still another object of this invention is to provide the horizontal type vulcanizer adapted to prevent the bath liquid having high temperature from directly contacting the cooling water, to thereby prevent accidental explosion.

Briefly and in accordance with the present invention, an inlet portion of a horizontal vulcanization bath through which the elongated member enters into the bath is in direct contact with a head of an extruder, and an outlet thereof is provided with a sealing means such as V-shaped cone packing. At the downstream side of the sealing means, a cooling subsystem is disposed through a intermediate separation portion such as an air chamber. The intermediate separation portion serves to prevent the bath liquid having high temperature from directly contacting the cooling water, even if the bath liquid is leaked from the bath through the sealing means.

In the present invention, since the bath liquid having high temperature is in direct contact with a front face of the die, the head of the extruder, particularly the extrusion die is heated by the bath liquid so that natural or synthetic polymer within the head may be scorched during extruding operation. This invention also aims to avoid scorching. This object is attained by providing a cooling means for cooling the die per se or for cooling a portion of bath liquid contacting with the front face of the head. Examples of the cooling means are a water jacket provided in the die, a water jacket set at the inlet portion of the bath, and the like.

Further, according to the present invention, the following are used separately or in combination in order to minimize the amount of bath liquid leakage from the sealing means, or in order to surely prevent the danger of explosion:

(1) A subsystem is provided for balancing inner pressure of the vulcanization bath with the pressure in the intermediate separation portion.

(2) A subsystem for cooling the bath liquid is located adjacent to the sealing means in order to obviate thermal deterioration of the sealing means to thereby maintain sealability thereof for a prolonged period of time. Viscosity of bath liquid may be increased by the cooling to decrease leakage thereof into the intermediate separation portion.

(3) A discharge port is disposed in the bottom of the intermediate separation portion for discharging bath liquid leaking into the intermediate separation portion.

The invention will be described with reference to the accompanying drawings and the description of the preferred embodiments that follow.

BRIEF DESCRIPTION OF THE DRAWINGS

In the drawings:

FIG. 1 is a cross-sectional schematic view showing a vulcanizer according to the present invention;

FIG. 2 is a cross-sectional illustration showing a die and inlet portion of a vulcanization bath according to the present invention;

FIG. 3 is a cross-sectional illustration showing a part for supporting V-shaped cone packing according to this invention;

DETAILED DESCRIPTION OF THE PREFERRED EMBODIMENTS

Figure 4:
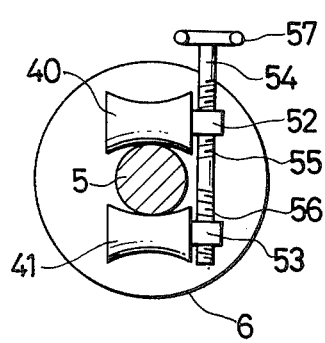
FIG. 4 is a cross-sectional view taken along the line IV—IV of FIG. 1 to show a first guide roll mechanism of this invention.

Referring to FIGS. 1–7, a core member 2 such as a stranded electrical conductor, inner tube used in the production of a high pressure hose, and the like, is drawn under constant tension from a core feeder 1 along the direction shown by an arrow. The core member, in advance being subject to drying or preheating or adhesion coating, if desired, is covered with vulcanizable polymer such as rubber and plastic materials at a cross-head 4 of an extruder 3 having a screw-feeder to thereby form elongated member 5 such as cable and hose. A straight horizontal type vulcanizating bath or vulcanizing tube 6 is fluid-tightly connected to the cross-head 4 through a packing 61 (FIG. 2) by means of bolts 63 extending from the cross-head 4 and nuts 64 via a flange 62 integrally provided with the tube 6. The inlet end of the tube 6 confronts with a front face 47A of an extrusion die 47 and the outlet end thereof is sealed by a V-shaped cone packing 7.

As shown in FIG. 3, the rear end (outlet end) of the vulcanization tube 6 is provided with a flange 6a which confronts with a flange 8a integrally formed with a front end of a tubular member 8 to fixedly interpose a flat peripheral end portion of the V-shaped cone packing 7 therebetween. The packing 61 and the V-shaped cone packing 7 are made of thermal resistant materials such as fluororubber.

Examples of the bath liquid employed in this invention are eutectic salt mixture, metals having low-melting point such as fusible alloys, organic liquids having a high boiling point such as silicone oil and polyethylene glycol and a liquid normally used in the art of "L.C.M." (liquid curing medium).

A heater 10 such as a band heater is formed around the vulcanization tube 6 in order to heat the bath liquid 9 contained therein to a temperature of about 150° C. to about 300° C. suitable for vulcanizing the unvulcanized polymer coating. Instead of the heater 10, other types of heating method may also be used to heat bath liquid 9, for example, a method shown in U.S. Pat. No. 2,616,126, wherein electric current is passed through the wall of the tube 6 to generate heat due to the electrical resistance thereof. The temperature of the bath liquid in the tube 6 is detected and controlled by a thermostat device (not shown) in order to maintain a predetermined temperature of the liquid. The longitudinal length of the vulcanization tube 6 is determined on the basis of the mutual relationship between the temperature of the bath liquid, line speed of the elongated member 5, reaction speed of the vulcanizing agent, and polymer extruding amount, while allowing a sufficient vulcanizing period. For example, the length of the tube is in a range of about 10 m to about 100 m. A reservoir 12 is provided in order to supply bath liquid into the vulcanization tube 6 and maintain the tube under pressure. A bottom wall of the reservoir 12 is connected to the bottom wall of the vulcanization tube 6 through a pipe 13 and a valve 16'. The interior space 15 of the reservoir 12 is subject to pressure by a pressure supply 18 such as a pump and high pressure gas cylinder, through a pressure control valve 16 and a pressure passage 17. By opening the valve 16, the pressure from the pressure supply 18 is applied into the vulcanization tube 6 through a bath liquid 14 in the reservoir 12, or through empty space of the reservoir 12 and the pipe 13, in case the all liquid therein has been supplied into the tube 6. The pressure range of the pressure supply 18 is in the usual range for heat-vulcanization, about 0.5 to 30 kg/cm$^2$ - G.

At the downstream side of the V-shaped cone packing 7, an air chamber 21 is provided which functions as an intermediate separation portion connected to the pressure supply means 18 through a branch pipe 64, a pressure control valve 65 and a pressure passage 67. The branch pipe 64 is also connected to the vulcanization tube 6 in order to control the pressure differential between the air chamber 21 and the vulcanization tube 6. Reference numerals 68 and 69 designate a pressure gauge and a heater, respectively.

By opening the pressure control valve 65, the pressure between the tube 6 and the air chamber 21 is balanced, resulting in minimizing the amount of the bath liquid leaking from the packing 7 into the air chamber 21, even if the sealability of the packing 7 is insufficient. The valve 16' disposed in the pipe 13 is opened in supplying liquid into the tube 6, and is closed during operation. By applying pressure to the bath liquid 9 in the tube 6, the expansion of the micro-voids (minute bubbles) in the polymer coating is prevented, to thereby provide a fine, uniform cured structure for the polymer coating. A heater 19 surrounds the tank 12 and the pipe 13 to maintain the heat medium in liquidized state as a bath liquid.

According to the present invention, since bath liquid leakage from the inlet and outlet of the vulcanizing tube 6 is substantially prevented, recirculation of the bath liquid as is done in the prior art is not required. However, it is preferable to provide an agitator (not shown) in the vulcanizing tube 6 to agitate or stir the bath liquid contained therein, to thus enhance heating efficiency for high speed vulcanization of the elongated member 5.

A tubular member 8 connected to the vulcanization tube 6 is provided with an annular projection 20 at the inner wall thereof to divide the same into the air chamber 21 and a cooling chamber 22.

Tanks 25 and 27 are disposed below the tubular member 8 to accumulate leaked bath liquid and cooling water therein, through discharge ports 24 and 26, respectively. The tank 25 is held at a temperature enough to melt the content therein by means of a heater 25A disposed therearound. Tanks 25 and 27 are connected to valves 28 and 29, respectively. These valves are normally closed in order to prevent leakage in the air chamber 21. However, the valves are opened when the liquids exceed the predetermined level in tanks 25 and 27 by detecting liquid level by means of liquid level sensor (not shown).

A partition wall 23 of tanks 25 and 27 vertically extends into the air chamber 21 over the level of the bottom wall of the tubular member 8, to thereby obviate direct contact of a cooling water overflowing from the projection 20 and the bath liquid leaking from the tube 6 through the V-shaped packing 7.

A shower 30 is connected to a water pipe 71 in order to eject cooling water toward the elongated member 5.

Figure 6:
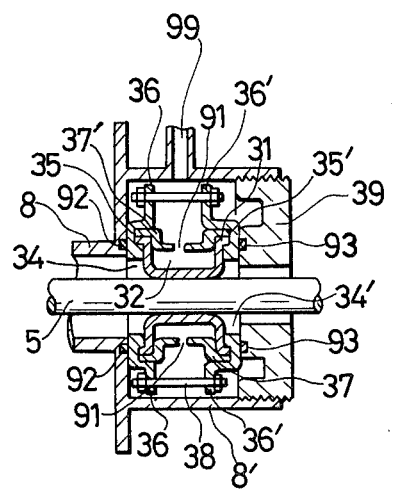
FIG. 6 is a cross-sectional view showing an end seal of a cooling subsystem using a U-shaped packing used in this invention.

The front end seal portion of the cooling chamber 22 is directly subjected to pressure in the air chamber 21. If the sealability at this portion is insufficient, gas leakage may occur, and the pressure balance between the vulcanization tube 6 and the air chamber 21 is degraded. Therefore, the sealing means at the front end portion of the cooling chamber 22 should have excellent sealability. As shown in FIGS. 1 and 6, U-shaped packing 31 made of a rubber resilient member is used as an example of such a sealing means to provide a sufficient pressure seal.

As shown in FIG. 6, the U-shaped packing 31 has a flange which together with a pair of subdivided stepped members 37, 37′ engages annular recesses 35, 35′ formed in a pair of support discs 36, 36′ provided with central bores 34, 34′. The support discs 36, 36′ are integrally and coaxially secured with each other by volts 38, and are positioned in a large diameter portion 8′ of the tubular member 8. The disc 36 is in contact with the outlet portion of the tubular member 8 while the other disc 36′ is in contact with a disc support 39 threadingly engaged with an inner thread formed in the larger diameter portion 8′. Therefore, these support discs 36, 36′ are fixedly supported and urged toward the outlet of the tubular member 8 by the threading engagement.

Furthermore, the support discs 36, 36′ are fluid-tightly secured in the larger diameter portion 8′ by an O-ring 92 disposed in a side wall of the larger diameter portion 8′ and an O-ring 93 disposed in an inner side face of the disc support 39. The larger diameter portion 8′ is provided with a pipe 99 connected to a pressurized pump (not shown) in order to apply pressure into the larger diameter portion 8′. The pressure is applied to an annular chamber 32 through a hole 91 defined between the stepped members 37, 37′ to thereby close contact between the inner surface of the U-shaped packing 31 and the surface of the elongated member 5, to thereby ensure a seal therebetween. The sealability is controlled by controlling the pressure from the pressurized pump.

Figure 7:
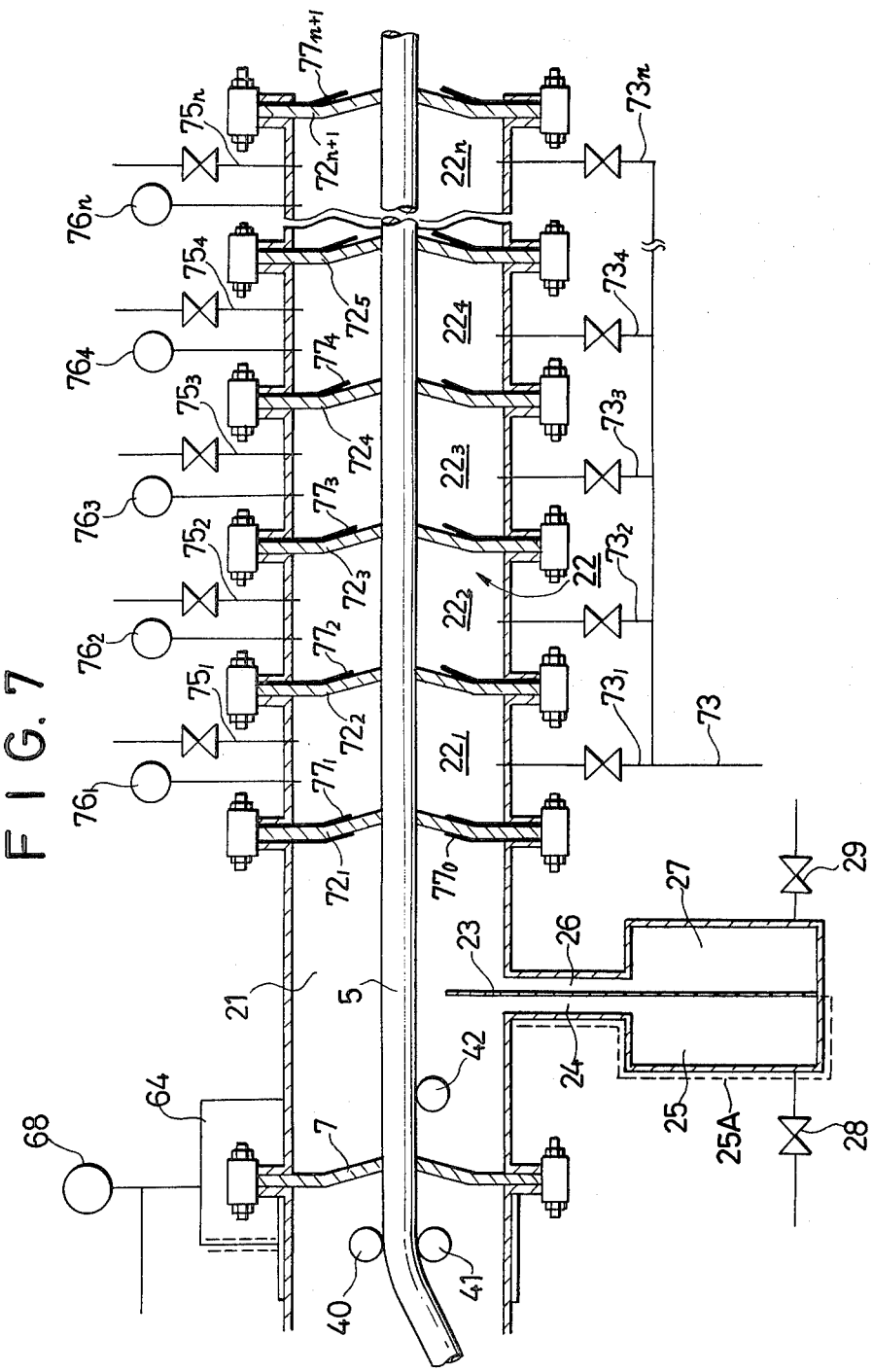
FIG. 7 is a cross-sectional schematic view of a cooling chamber wherein multiple stage seals are used according to another embodiment of the present invention.

In FIG. 7, a second embodiment of the cooling chamber 22 is shown, wherein a plurality of cooling compartments $22_1$ to $22_n$ are formed by providing a plurality of V-shaped cone packing $72_1$ to $72_{n+1}$ and washers $77_0$, $77_1$ to $77_{n+1}$ for supporting these packings. Each of the cooling compartments is connected to branch pipes $73_1$ to $73_n$ connected to a main pipe 73 in order to supply high pressurized cooling water therein, and is connected to discharge pipes $75_1$ to $75_n$. Each compartment also provides water-pressure gauges $76_1$ to $76_n$. The elongated member 5 coming from the air chamber 21 passes through central bores each formed in the V-shaped cone packing $72_1$ to $72_{n+1}$ and cooled by cooling water filled in each compartment $22_1$ to $22_n$. Since the cooling chamber shown in FIG. 7 is divided into a plurality of cooling compartments by packings, multiple seals are obtained, also, pressure leakage from the tip end packing $77_{n+1}$ is minimized even if one of the packings $77_1$ to $77_{n+1}$ is deteriorated during operation, whereby pressure in the air chamber 21 is stabilized.

The number of compartments is determined by the longitudinal length of the cooling chamber 22, pressure in the vulcanization bath 6 (pressure in the air chamber 21). However, the number is in a range of 2 to about 100, preferably about 5 to about 50 in case the length of the cooling chamber is 5 to 50 m and pressure range in the vulcanization bath is 0.5 to 30 kg/cm$^2$ - G.

During operation, even if the cooling water in each compartments $22_1$ to $22_n$ is discharged from the discharge pipes $75_1$ to $75_n$, some of the water may leak toward the downstream side of the compartment from a minute clearance between the elongated member 5 and control bores formed in the packings $72_1$ to $72_{n+1}$. Finally the water may leak to the atmosphere from the packing $72_{n+1}$. The water pressure in the compartments is controlled to be equal with each other. However, in order to minimize water leakage amount from the packing $72_{n+1}$, the water pressure is gradually reduced toward the compartment $22_n$. If the water pressure in each compartment is controlled to have the water pressure in the compartment $22_n$ being equal to or slightly larger than the atmospheric pressure, the sealability between each compartments is stabilized, to thus ensure and facilitate pressure control of the cooling water in each compartment.

The water pressure in each of the compartments is controlled by controlling the water supply amount from the branch pipes $73_1$ to $73_n$ and/or by the controlling water discharge amount from the discharge pipes $75_1$ to $75_n$.

The resistive force of the packings $72_1$ to $72_{n+1}$ against travel of the elongated member 5 is relatively smaller than that of U-shaped packing 31 shown in FIG. 6. Such a multiple seal type cooling chamber shown in FIG. 7 is suitable for producing the elongated member easily deformable by an external force and those to be required to have a precise cross-sectional dimension, such as multiple layer hose.

According to the present invention, another technique is utilized in order to minimize bath liquid leaking amount from the V-shaped cone packing 7 into the air chamber 21.

As shown in FIG. 1, a cooling jacket 45 is provided around the vulcanization tube 6 at a position adjacent to the outlet portion of the tube 6 (adjacent to the V-shaped cone packing 7) in order to reduce the bath liquid temperature near the packing 7. This tends to obviate or eliminate thermal deterioration or degradation of the packing 7. The cooling of the bath liquid is achieved by continuously introducing cooling water into the cooling jacket 45 and discharging it. The cooling degree is dependent on the characteristics of the bath liquid such as temperature viscosity relationship, melting point thereof, size of the elongated member to be produced, and production speed. For example, the temperature of the bath liquid has a lower limit not degrading smooth travel of the elongated member. It is a temperature of the cooling limit at which the viscosity of the bath liquid becomes too high, or solidification thereof occurs.

The cooling degree control is established by controlling water temperature and/or water amount introduced into the cooling jacket 45.

In FIG. 1, the cooling jacket is disposed on the outer peripheral surface of the tube 6. The jacket can be disposed in the inner side of the tube in order to increase cooling degree, if desired.

Furthermore, the longitudinal length of the cooling jacket 45 is suitably in a range of about 10 cm to about 2 m. In addition to the elimination of the thermal deterioration of the packing 7, sealability of the packing 7 is enhanced for a long period of time because the viscosity increase of the bath liquid by cooling the same.

Referring to FIGS. 1 and 4, a pair of guide rolls 40, 41 are disposed in the vulcanization tube 6 to guide travel of the elongated member 5. These guide rolls 40, 41 are rotatably supported by shafts 52 and 53 horizontally extended and threadingly engaged with threads 55 and 56 formed in a vertical adjusting screw 54. The threading directions of these threads 55, 56 are opposite each other, so that the guide rolls are moved in opposite vertical directions by rotating a handle 57 formed on the upper end of the adjusting screw 54. With this structure, the upper and lower surfaces of the elongated member 5 will slightly contact the guide rolls, to thereby position the elongated member at the central portion of the vulcanization tube 6. The adjusting screw 54 is rotatably supported by a boss (not shown) having a sealing means formed on the vulcanization tube 6.

Figure 5:
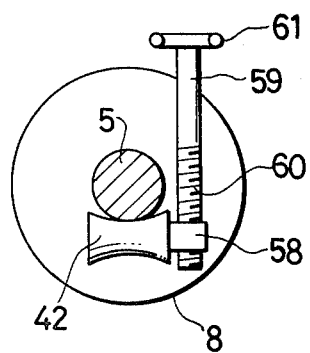
FIG. 5 is a cross-sectional view taken along the line V—V of FIG. 1 to show a second guide roll mechanism of this invention.

Referring now to FIGS. 1 and 5, a second guide roll 42 is disposed in the tubular member 8. The guide roll 42 is rotatably supported by a shaft 58 horizontally extending and threadingly engaged with a thread 60 formed in a vertical adjusting screw 59. The roll 42 is vertically movable by rotating a handle 61 formed on the upper end of the adjusting screw 59 in order to position the elongated member 5 passing through the packing 7 at the central position of the tubular member 8. The adjusting screw 59 is rotatably supported by a boss (not shown) having a sealing means formed on the tubular member 8. Because of the employment of the guide rolls 40, 41 and 42, the control axis of the elongated member 5 can be in alignment with the center of the hole of the cone packing 7 passing the member 5 therethrough. This will prevent the elongated member 5 from local contact with the hole of the packing 7 and sealability of the packing 7 is enhanced to decrease bath liquid leakage therethrough.

FIG. 2 shows a means for preventing the polymer from scorching within the cross-head 4. As mentioned above, vulcanizable polymer 51 is coated on the core member 2 by the die 47. If the scorching occurs prior to the coating of the polymer on the core member 2, and such scorched polymer is coated on the core, the appearance of the elongated member is degraded and mechanical characteristics thereof are greatly reduced. Furthermore, the extruding operation would not be carried out by the scorching.

The die 47 has a water jacket 48 having a cooling water inlet and outlet (not shown). The inlet is, for example, connected to a water service and the outlet is connected to a discharge tank (not shown) in order to always pass the cooling water through the jacket 48.

A cylindrical water jacket 49 having a longitudinal length of, for example, 100 mm and having a cooling water inlet and outlet (not shown) is disposed at the inlet portion of the vulcanization tube 6. The inner surface of the water jacket 49 is spaced from the elongated member 5, and the interior of the water jacket 49 is supplied with cooling water. A nipple 50 and vulcanizable polymer 51 such as rubber and plastic materials are also shown in FIG. 2.

In order to avoid scorching of the polymer 51, the bath liquid near the front face of the die 47 is cooled by the water jacket 49 to avoid excessive heating of the die by the bath liquid. Alternatively, the die 47 is directly cooled by the water jacket 48 as above mentioned. The employment of the water jacket 49 can achieve better effect to prevent the scorching than that of the water jacket 48. The best effect can, however, be achieved by employing both the water jackets 48 and 49.

In case of the employment of the bath liquid such as silicone oil which can be cooled below the extrusion temperature of the vulcanizable polymer at the position adjacent to the die 47, scorching of the polymer can be prevented by using only the water jacket 49. On the other hand, in case of the employment of the bath liquid whose cooling temperature limit is above the extrusion temperature, it is preferable to use both the water jacket 49 and the water jacket 48. Such a bath liquid is for example, an eutectic mixture of salts consisting of by weight of 7% $NaNO_3$, by weight of 40% $NaNO_2$ and by weight of 53% $KNO_3$. The melting point of the eutectic mixture of salts is around 145° C.

Additionally, in case of the employment of such salt mixtures as a bath liquid, it is preferable to cool the mixture to such a extent to provide a thin solidified layer of the mixture along the surface of the water jacket 49, together with the front face 47A of the die 47, and simultaneously to cool the die 47 to the temperature equal to or somewhat below the extrusion temperature. Such a cooling control is easily achieved by controlling the water temperature and water supply amount into the cooling jacket 48 and/or the water jacket 49. The water jacket 49 is not necessarily disposed to contact with the front face 47A of the die, but can be disposed spaced therefrom but still permitting the bath liquid near the die 47 to cool the suitable temperature. Alternatively, the water jacket 49 can be disposed on the outer peripheral surface of the vulcanization tube 6.

Furthermore, instead of the employment of the water jacket 49, the inlet portion of the vulcanization tube 6 is formed to have a smaller diameter in order to reduce thermal capacity of the bath liquid positioned between the elongated member 5 and the small diameter portion of the tube 6 to allow natural heat radiation from the outer periphery of the tube 6. That is, the small diameter portion of the tube 6 functions as a radiator.

As shown in FIG. 1 a supporting plate 43 is made of stainless steel having smooth surface. The plate 43 is fixed to the bottom wall of the vulcanization tube 6 by a plurality of brackets (not shown). Generally, the inner peripheral surface of the tube 6 is not subject to machining. Therefore, if the elongated member 5 slides on the inner surface during passing through the tube 6, the elongated member surface is damaged. The supporting plate 43, however, can avoid damages of the elongated member even if the elongated member contact with the supporting plate 43.

Alternatively, the support plate is formed on the bottom wall of the tube 6 through a cushion member such as a plurality of springs provided on the inner surface of the tube 6. In case the elongated member floats on the bath liquid, the stainless plate is fixed to the upper portion of the tube 6 to serve as a stopper plate. Instead of the supporting plate 43, a metal tube having a finely finished inner surface is provided in the vulcanization tube 6, through which the elongated member 5 is passed to thereby avoid damages of the elongated member surface.

The polymer coating formed on the elongated member 5 at the cross-head 4 is vulcanized during travel in the pressurized bath liquid having vulcanization temperature filled in the vulcanization tube 6. The elongated member 5 passes through the V-shaped cone packing 7 and the air chamber 21, thereafter is passed through the cooling chamber 22 in which the member is cooled. The bath liquid adhered to the surface of the member is removed or washed out by the shower 30.

Thereafter, the elongated member is wound around a takeup means 95 through a drawing means 94.

In view of the above, according to the present invention, the following advantages can be attained.

(a) Despite the employment of the horizontal type vulcanizer for the purpose of preventing the elongated member from being deformed, the recirculation of the bath liquid is not required, and a compact and an economical apparatus is utilized.

(b) Since the air chamber 21 is provided between the vulcanization tube 6 and the cooling chamber 22, explosion due to the direct contact of the bath liquid having high temperature and the cooling water is obviated, to thereby provide a safety factor in the apparatus.

(c) Since the pressure between the vulcanization tube 6 and the air chamber 21 is balanced, and since the bath liquid is provided with low temperature zone by providing the cooling jacket 45, the bath liquid amount leaking from the vulcanization tube 6 into the air chamber 21 through the V-shaped cone packing 7 can be minimized.

(d) Since the front face of the die 47 is maintained at a low temperature, scorching is prevented in spite of the fact that one end of the vulcanization tube 6 confronts with the front face of the die.

While the invention has been described in detail and with reference to specific embodiments thereof, it will be apparent to one skilled in the art that various changes and modifications can be made therein without departing from the spirit and scope thereof.

For example, though the foregoing disclosure describes a horizontal type vulcanizer, a vulcanizer of somewhat inclined type is within the scope of this invention.

What is claimed is:

1. A continuous extruding and vulcanizing apparatus comprising:
   (a) an extruder for forming an elongated member from a polymer;
   (b) a vulcanizing bath for vulcanizing said polymer of an elongated member, said bath having one end connected to a head of said extruder;
   (c) sealing means disposed at one end of said vulcanizing bath opposite to the end coupled to said extruder, said bath being filled with pressurized liquid heat medium, said liquid heat medium being in contact with said sealing means;
   (d) an intermediate separation portion connected to said sealing means;
   (e) cooling means for providing cooling water connected to said intermediate separation portion to cool said elongated member vulcanized in said vulcanizing bath said intermediate separation portion preventing direct contact of said liquid heat medium having a high temperature with said cooling water; and
   (f) means for balancing inner pressures between said vulcanizing bath and said intermediate separation portion.

2. A continuous extruding and vulcanizing apparatus comprising:
   (a) an extruder for forming an elongated member from a polymer;
   (b) a vulcanizing bath for vulcanizing said polymer of an elongated member, said bath having one end connected to a head of said extruder;
   (c) sealing means disposed at an end of said vulcanizing bath opposite to the end coupled to said extruder, said bath being filled with a pressurized liquid heat medium other than water, said liquid heat medium being in contact with said sealing means;
   (d) an intermediate separation portion connected to said sealing means; and
   (e) cooling means for providing cooling water connected to said intermediate separation portion to cool said elongated member vulcanized in said vulcanizing bath, said intermediate separation portion preventing direct contact of said liquid heat medium having a high temperature with said cooling water.

3. A continuous extruding and vulcanizing apparatus comprising:
   (a) an extruder for forming an elongated member from a polymer;
   (b) a vulcanizing bath for vulcanizing said polymer of an elongated member, said bath having one end connected to a head of said extruder;
   (c) sealing means disposed at an end of said vulcanizing bath opposite to the end coupled to said extruder, said bath being filled with pressurized liquid heat medium, said liquid heat medium being in contact with said sealing means;
   (d) an intermediate separation portion connected to said sealing means having little or none of said liquid heat medium located therein during the operation of said vulcanizing apparatus; (e) cooling means for providing cooling water connected to said intermediate separation portion to cool said elongated member vulcanized in said vulcanizing bath, said intermediate separation portion preventing direct contact of said liquid heat medium having a high temperature with said cooling water.

4. The apparatus of claims 1 or 2 wherein said vulcanizing bath extends straight and horizontally from said extruder.

5. The apparatus of claims 1 or 2 wherein said liquid heat medium has a melting point of at least about 100° C.

6. The apparatus of claim 5 wherein said liquid heat medium is eutectic mixtures of salts consisting of $NaNO_3$, $NaNO_2$ and $KNO_3$.

7. The apparatus of claims 1 or 2 further comprising means for cooling a part of said liquid heat medium in said vulcanizing bath, said means being disposed at a position to cool said part of liquid heat medium positioned adjacent said sealing means to avoid thermal deterioration thereof.

8. The apparatus of claims 1 or 2 further comprising means for balancing inner pressures between said vulcanizing bath and said intermediate separation portion.

9. The apparatus of claim 8, wherein said cooling means has an outlet end provided with a U-shaped resilient packing means, the inner peripheral surface of said U-shaped packing being inwardly urged by pressurizing means connected thereto.

10. The apparatus of claim 8, wherein said cooling means is divided into a plurality of cooling compartments by a plurality of V-shaped cone packings, each of said cooling compartments being connected to means for controlling water pressure applied thereto.

11. The apparatus of claims 1, 2 or 3 further comprising means for cooling a die of said extrusion head and means for cooling a part of said liquid heat medium located adjacent to said extrusion head.

12. The apparatus of claims 1, 2 or 3 further comprising means for cooling a part of said liquid heat medium located adjacent to said extrusion head.

* * * * *